(12) United States Patent
Wang et al.

(10) Patent No.: US 12,045,667 B2
(45) Date of Patent: Jul. 23, 2024

(54) AUTO-SPLIT AND AUTO-MERGE CLUSTERS

(71) Applicant: International Business Machines Corporation, Armonk, NY (US)

(72) Inventors: Hai Hui Wang, Xian (CN); Xun Pan, Xian (CN); Xiang Zhen Gan, Xian (CN); Peng Li, Xian (CN); Yuanyuan He, Xi'an (CN); Shan Gao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 17/391,093

(22) Filed: Aug. 2, 2021

(65) Prior Publication Data

US 2023/0032812 A1    Feb. 2, 2023

(51) Int. Cl.
*G06F 9/46*    (2006.01)
*G06F 9/50*    (2006.01)
*G06F 16/28*   (2019.01)

(52) U.S. Cl.
CPC .......... *G06F 9/5083* (2013.01); *G06F 16/285* (2019.01)

(58) Field of Classification Search
CPC .................................................. G06F 9/5083
USPC ....................................................... 718/105
See application file for complete search history.

(56) References Cited

U.S. PATENT DOCUMENTS

| | | | | |
|---|---|---|---|---|
| 9,460,183 B2* | 10/2016 | Dalton | ................ | G06F 11/2097 |
| 10,268,382 B2* | 4/2019 | Shung | .................. | G11C 11/005 |
| 10,560,315 B2* | 2/2020 | Yuan | .................... | H04L 41/0677 |
| 11,385,976 B1* | 7/2022 | Krisman | ............ | G06F 11/1658 |
| 2004/0205148 A1* | 10/2004 | Bae | ...................... | G06F 11/1425 |
| | | | | 709/213 |
| 2006/0031266 A1* | 2/2006 | Colbeck | .............. | G06F 16/1844 |
| 2007/0106771 A1* | 5/2007 | Lucash | ............... | H04L 67/1095 |
| | | | | 709/223 |

(Continued)

FOREIGN PATENT DOCUMENTS

CN    102394914 A    3/2012
CN    104158707 A    10/2017

OTHER PUBLICATIONS

"Split-Brain", NCache Docs, downloaded from the Internet on Apr. 19, 2021, 7 pages, <https://www.alachisoft.com/resources/docs/ncache/admin-guide/split-brain.html>.

(Continued)

*Primary Examiner* — Mehran Kamran
(74) *Attorney, Agent, or Firm* — Stephen R. Yoder

(57) ABSTRACT

Methods, computer program products, and/or systems are provided that perform the following operations: identifying a first workload being processed by a first plurality of sites in a cluster; identifying, from the first plurality of sites: (i) a first site as a primary site for the first workload, and (ii) one or more secondary sites for the first workload; identifying a communication link issue between the first site and at least one of the one or more secondary sites; splitting the cluster into sub-clusters based, at least in part, on the communication link issue, wherein the first site is included in a first sub-cluster of the sub-clusters and the at least one of the one or more secondary sites is included in a sub-cluster of the sub-clusters that is different from the first sub-cluster; and instructing the first sub-cluster to locally process the first workload.

20 Claims, 11 Drawing Sheets

(56) References Cited

U.S. PATENT DOCUMENTS

| | | | | |
|---|---|---|---|---|
| 2012/0166866 A1* | 6/2012 | Rao | ............... | G06F 11/2028 714/E11.073 |
| 2013/0024479 A1* | 1/2013 | Gong | ............... | G06F 9/5066 707/E17.011 |
| 2013/0254210 A1* | 9/2013 | Morris | ............... | G06F 16/2228 707/741 |
| 2014/0258771 A1* | 9/2014 | Xie | ............... | G06F 11/2005 714/4.11 |
| 2015/0286707 A1* | 10/2015 | Levitan | ............... | G06F 16/9027 707/737 |
| 2016/0147665 A1* | 5/2016 | Magdon-Ismail | ............... | G06F 11/3452 711/118 |
| 2016/0323161 A1* | 11/2016 | Cuervo Laffaye | ............... | G06F 9/5044 |
| 2017/0139789 A1* | 5/2017 | Fries | ............... | H04L 43/10 |
| 2017/0171223 A1* | 6/2017 | Barsness | ............... | H04L 9/085 |
| 2017/0195412 A1* | 7/2017 | Abu-Ghazaleh | ............... | H04L 67/02 |
| 2017/0235603 A1* | 8/2017 | Baughman | ............... | G06Q 10/101 718/105 |
| 2018/0103088 A1* | 4/2018 | Blainey | ............... | H04L 67/10 |
| 2019/0268215 A1* | 8/2019 | Tellado | ............... | H04L 41/0672 |
| 2020/0145283 A1* | 5/2020 | Zeng | ............... | H04L 41/40 |
| 2020/0344322 A1* | 10/2020 | Zhu | ............... | H04L 47/821 |
| 2021/0089381 A1* | 3/2021 | Johar | ............... | G06F 11/0751 |
| 2021/0132993 A1* | 5/2021 | Chiplunkar | ............... | G06F 9/321 |
| 2021/0294668 A1* | 9/2021 | Chaganti | ............... | G06F 9/5083 |
| 2021/0294816 A1* | 9/2021 | Chaganti | ............... | G06F 16/275 |
| 2023/0032812 A1* | 2/2023 | Wang | ............... | G06F 9/5044 |
| 2023/0161633 A1* | 5/2023 | Wang | ............... | G06F 9/505 718/105 |

OTHER PUBLICATIONS

Authors et al.: Disclosed Anonymously, "Adaptive Cluster Split Merge for Cloud", An IP.com Prior Art Database Technical Disclosure, IP.com No. IPCOM000260153D, IP.com Electronic Publication Date: Oct. 25, 2019, 8 pages.

Zhong-Dong et al., "Dynamic Merge Clustering Algorithm and its Application in Evaluation of the Regional Scientific and Technological Innovation Capability", Journal of Applied Sciences, 13: 1499-1503, 5 pages, DOI: 10.3923/as.2013.1499.1503, <https://scialert.net/fulltext/?doi=jas.2013.1499.1503>.

* cited by examiner

US 12,045,667 B2

AUTO-SPLIT AND AUTO-MERGE CLUSTERS

BACKGROUND

The present invention relates generally to the field of cluster management, and more particularly to providing for the auto-splitting a cluster into sub-clusters and auto-merging sub-clusters into one cluster.

SUMMARY

According to an aspect of the present invention, there is a method, computer program product and/or system that performs the following operations (not necessarily in the following order): identifying a first workload being processed by a first plurality of sites in a cluster; identifying, from the first plurality of sites: (i) a first site as a primary site for the first workload, and (ii) one or more secondary sites for the first workload; identifying a communication link issue between the first site and at least one of the one or more secondary sites; splitting the cluster into sub-clusters based, at least in part, on the communication link issue, wherein the first site is included in a first sub-cluster of the sub-clusters and the at least one of the one or more secondary sites is included in a sub-cluster of the sub-clusters that is different from the first sub-cluster; and instructing the first sub-cluster to locally process the first workload.

DETAILED DESCRIPTION

Figure 1:
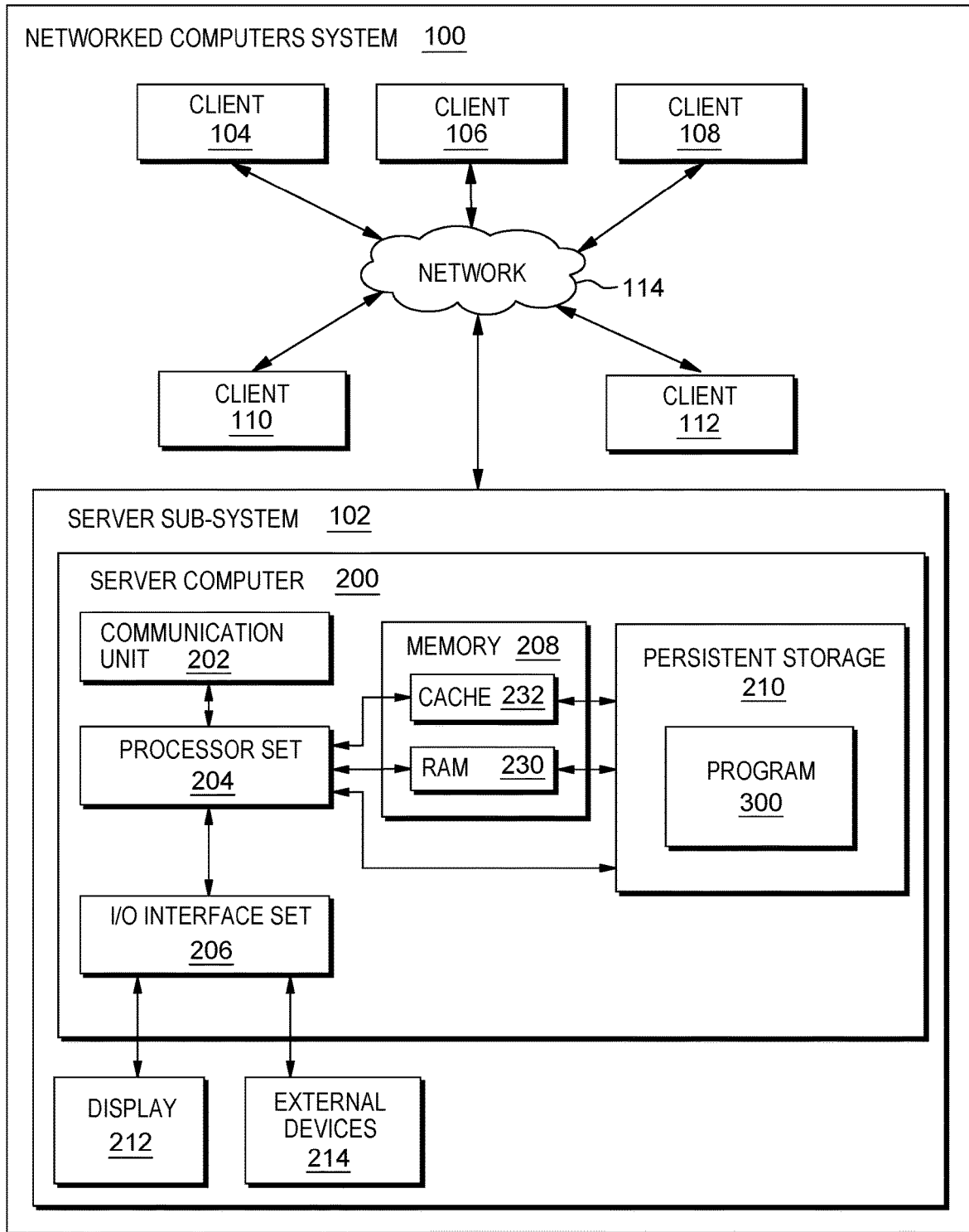
FIG. 1 depicts a block diagram view of a first embodiment of a system, according to the present invention.

According to aspects of the present disclosure, systems and methods can be provided cluster management. In particular, systems and methods of the present disclosure can provide for assigning a primary or secondary (or "candidate") system at each site included in a cluster. The systems and methods of the present disclosure can provide for auto-splitting the cluster into sub-clusters in the event of a communication failure between cluster sites, for example, using the primary and/or candidate cluster systems. The systems and methods of the present disclosure can provide for auto-merging the sub-clusters into the one original cluster in response to resolution of the communication failures.

Often, a cluster may be originally created at one site to meet initial workload requirements. Over time, the cluster may be enlarged to add more resources, for example at another site, usually due to increased demands. In many cases, the cluster eventually includes resources across multiple sites connected by some type of network (e.g., virtual private network (VPN), etc.). Situations may arise where network issues (e.g., network failure lasting for some period, etc.) may disrupt connections between sites within a cluster resulting in failure of some part of the cluster, resource issues, and/or the like.

Accordingly, systems and methods of the present disclosure can provide for cluster management to mitigate cluster disruptions, for example, when network communication fails among some cluster sites. The systems and method of the present disclosure can provide for pre-allocating workloads of a cluster to different primary sites, and periodically synchronizing each workload's checkpoint data to its respective primary site, for example, if the expense of synchronization is acceptable. The systems and methods of the present disclosure can provide for auto-splitting the cluster into multiple sub-clusters, for example, in response to a connections failure and/or the like between sites included in the cluster, such that the sub-clusters can continue to work at the local sites, based on the pre-allocation. The systems and methods of the present disclosure can provide for the sub-clusters to automatically manage workloads (e.g., by status, etc.) and store cluster data locally (e.g., local cache, local temporary storage, etc.). The systems and methods of the present disclosure can provide for enhancing workload scheduling, for example, to perform automatic pre-scheduling for workloads in queue for all sub-clusters to optimize CPU resources. The systems and methods of the present disclosure can provide for the sub-clusters to be auto-merged into one cluster when connection issues between cluster sites are resolved, and for example, merging all cluster data in a primary cluster storage.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can auto-split a cluster into multiple sub-clusters, manage workloads at a sub-cluster, store sub-cluster data at a local cache, pre-schedule (pre-assign) workloads in queue, handle local requests at a sub-cluster, auto-merge sub-clusters into one cluster, merge cluster data from sub-clusters at a primary cluster site/system, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
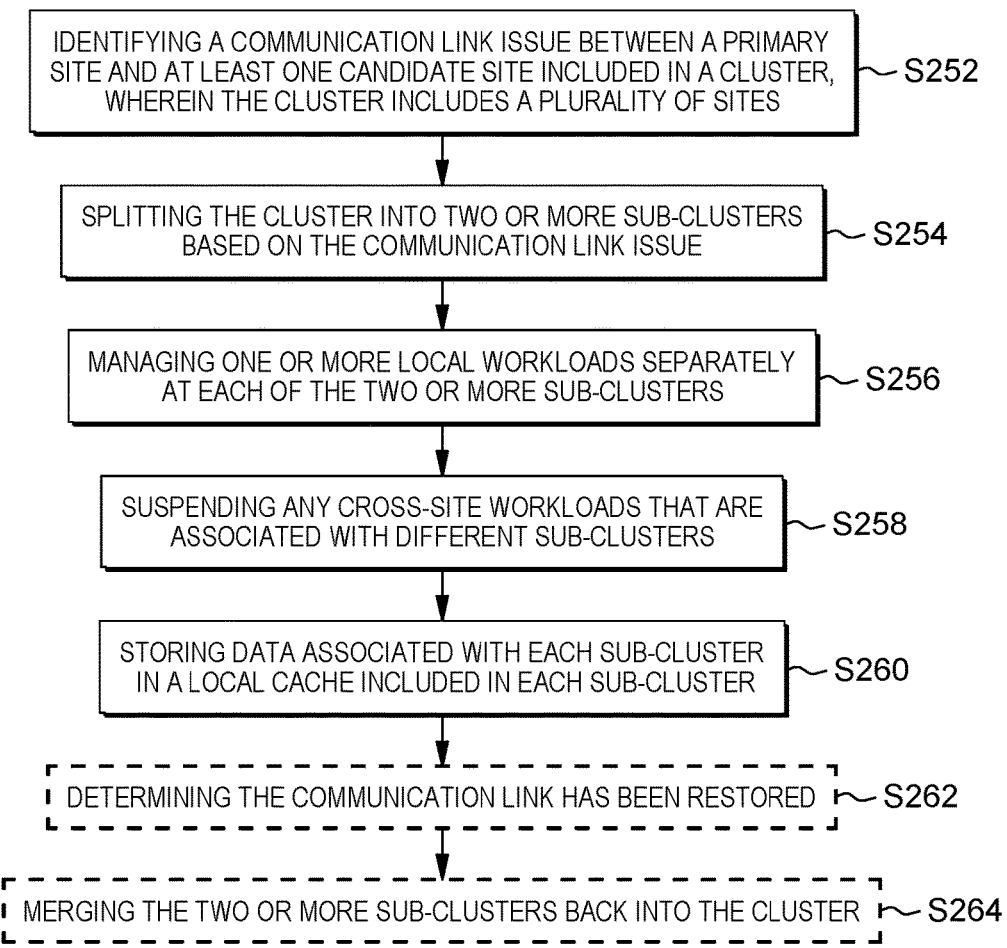
FIG. 2 depicts a flowchart showing a first embodiment method performed, at least in part, by the first embodiment system.
Figure 3:
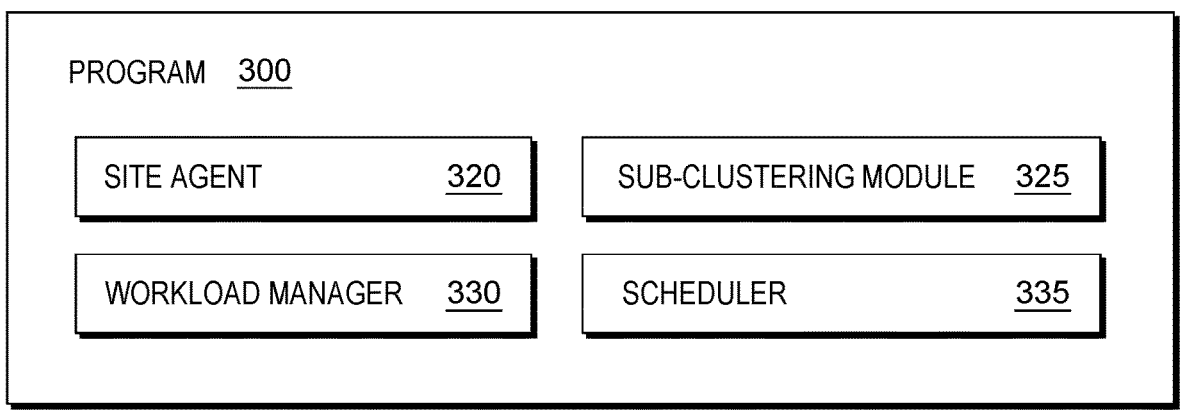
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for automatically splitting and/or merging a computing cluster begin at operation 5252, where a computing system (e.g., server computer 200 of FIG. 1 or the like) can identify a communication link issue (e.g., network failure, etc.) between a primary site and at least one candidate site included in a computing cluster. As an example, a site agent module 320 of FIG. 3 and/or the like can provide for identifying that one or more nodes/systems at a site within the cluster have lost communication with other sites (e.g., the primary site, etc.) included in the cluster (e.g., network failure between the sites, etc.). A computing cluster can include a plurality of sites with each site having one or more nodes that handle workloads for the cluster. A cluster can include a primary site system which can manage the cluster workloads, resources, and/or the like. Other sites included in the cluster can be designated as candidate sites and can include a candidate site system that can manage local workloads, local resources, and/or the like.

Processing proceeds to operation 5254, where the computing system (e.g., server computer 200 of FIG. 1 or the like) can split the cluster into two or more sub-clusters in response to the communication link issue, wherein the primary site is included in one of the two or more sub-clusters and the at least one candidate site affected by the communication link issue is included in another of the two or more sub-clusters. As an example, a sub-clustering module 325 and/or the like can provide for creating a sub-cluster that includes the site(s) that are associated with the communication failure (e.g., not in communication with the primary site, etc.). In some embodiments, the primary site can create a sub-cluster including any nodes/sites that the primary site is still in communication with. In some embodiments, multiple sub-clusters can be created in response to communication failures between multiple sites of the cluster. For example, each site of the cluster can be split off into a sub-cluster with all the nodes that are associated with the site. In some embodiments, for each sub-cluster associated with a candidate site, a candidate site system can be designated as the site manager for the sub-cluster and manage the nodes, workloads, resources, and/or the like associated with the sub-cluster.

Processing proceeds to operation 5256, where the computing system (e.g., server computer 200 of FIG. 1 or the like) manage one or more local workloads separately at each of the two or more sub-clusters. As an example, a workload manager 330 of FIG. 3, scheduler 335, and/or the like can manage the local workloads for the sub-cluster (e.g., workloads running on the node(s) associated with the sub-cluster, local to the sub-cluster site, etc.).

In some embodiments, the computing system (e.g., scheduler 335, etc.) can pre-schedule queued workloads in the sub-cluster as a local workload or a remote workload. As an example, a local workload may be associated with the current sub-cluster, whereas a remote workload may be associated with another sub-cluster in addition to the current sub-cluster. The computing system (e.g., scheduler 335, etc.) may only schedule local workloads for the sub-cluster (e.g., nodes associated with the sub-cluster, etc.).

Processing proceeds to operation 5258, where the computing system (e.g., server computer 200 of FIG. 1 or the like) suspend any cross-site workloads that are associated with different sub-clusters. As an example, a workload manager 330 of FIG. 3 and/or the like can suspend any cross-site workloads. In some embodiments, suspending cross-site workloads can include storing data associated with a cross-site workload (e.g., context, memory, etc.) locally in the sub-cluster (e.g., in a local cache/memory associated with the sub-cluster). In some embodiments, suspending cross-site workloads can include marking the cross-site workloads as future workloads (e.g., to be resumed upon restoration of communication with the primary site sub-cluster, etc.).

Processing proceeds to operation 5260, where the computing system (e.g., server computer 200 of FIG. 1 or the like) can store data associated with each sub-cluster in a local cache included in each sub-cluster. For example, data associated with local workloads, resources, and/or the like may be stored locally in the sub-cluster.

Optionally, in some embodiments, processing may continue to operation 5262, where the computing system (e.g., server computer 200 of FIG. 1 or the like) may determine the communication link has been restored. As an example, a site agent module 320 and/or the like can determine that the communication link between the sub-clusters has been restored (e.g., candidate site of sub-cluster is again in communication with the primary site/other sub-clusters, etc.).

Optionally, in some embodiments, processing may continue to operation 5264, where the computing system (e.g., server computer 200 of FIG. 1 or the like) can merge the two or more sub-clusters back into the cluster (e.g., restoring the original cluster, etc.). As an example, a sub-clustering module 325 and/or the like can provide for merging the sub-cluster back into the cluster. In some embodiments, for example, the data stored locally at the sub-cluster can be merged with other cluster data (e.g., at the primary site, etc.). In some embodiments, the primary site can resume scheduling/management of cluster workloads, for example, resuming cross-site workloads that were suspended in the sub-cluster(s). In some embodiments, the cluster can resume scheduling of workloads that were marked as remote in the sub-cluster(s).

Further Comments and/or Embodiments

Figure 4:
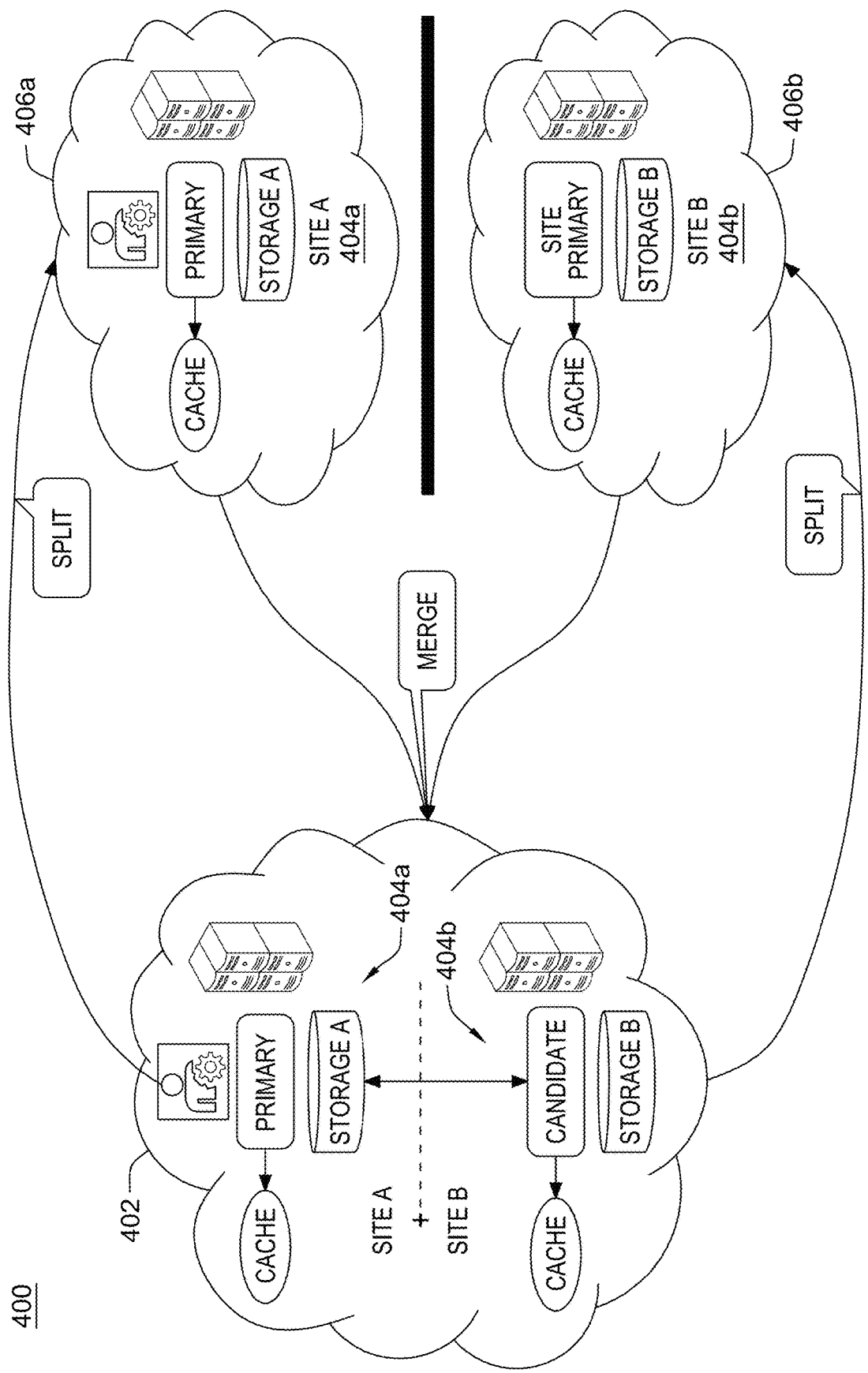
FIG. 4 depicts a block diagram of an example scenarios for auto-splitting and auto-merging clusters, according to embodiments of the present invention.

FIG. 4 depicts a block diagram of an example scenarios 400 for auto-splitting and auto-merging clusters, according to embodiments of the present invention. As illustrated in FIG. 4, a cluster 402 may include multiple sites, such as site 404a (e.g., Site A, primary site) and site 404b (e.g., Site B, candidate site), that are in communication. The cluster 402 may schedule and manage workloads, resource, and/or the like across the sites included in cluster 402. A network/communication failure may occur between site 404a and site 404b in the cluster 402. In response to the network failure, cluster 402 may be automatically split into multiple sub-clusters, where each sub-cluster includes one or more sites/nodes that are still in communication. For example, in response to the network failure, cluster 402 may be split into sub-cluster 406a including site 404a and sub-cluster 406b including site 404b. Each sub-cluster can then manage workloads, resources, nodes, and/or the like associated with the sub-cluster. Any workloads and/or the like that spanned multiple sites within the cluster that are now in separate sub-clusters can be suspend pending restoration of the communications (e.g., network, etc.) between sites.

When communications are restored between the sites/sub-clusters, the sub-clusters can be merged back into a single cluster (e.g., the original cluster, etc.). For example, sub cluster 406a and sub-cluster 406b can be merged to reform cluster 402.

Figure 5:
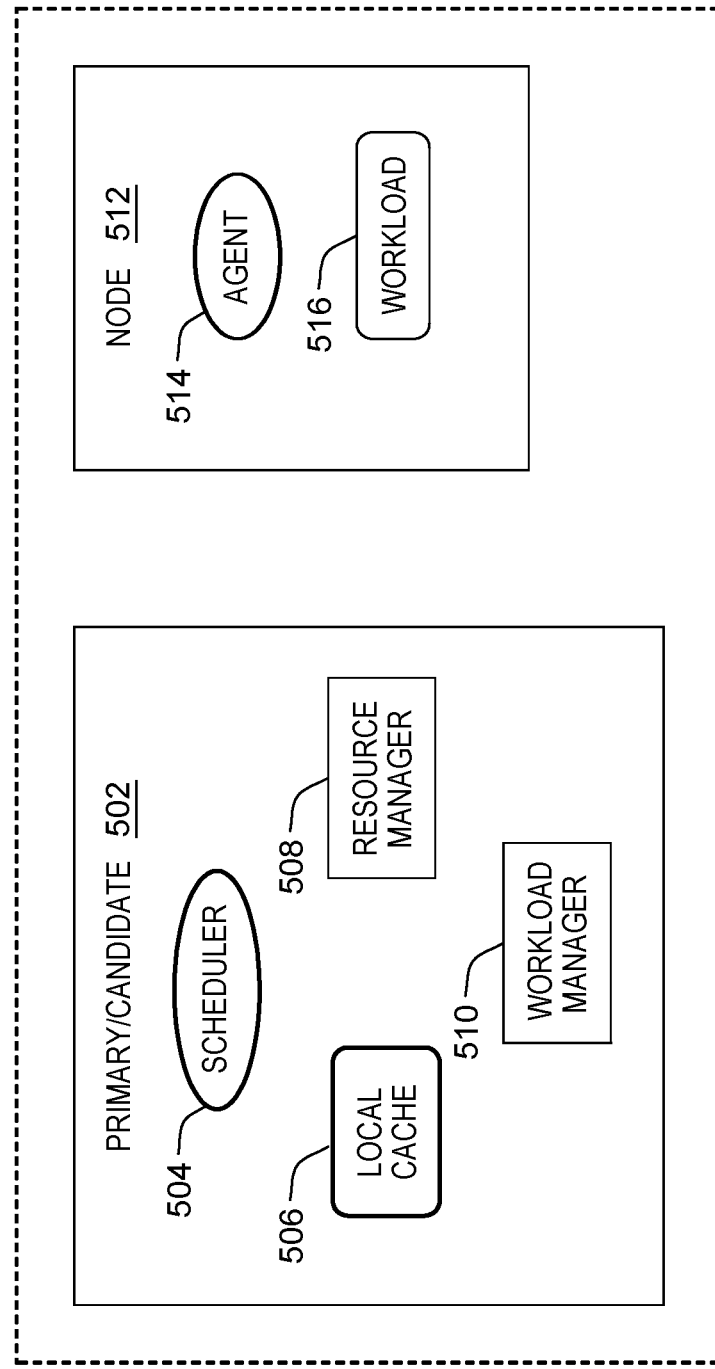
FIG. 5 depicts a block diagram of an example cluster system structure, according to embodiments of the present invention.

FIG. 5 depicts a block diagram of an example cluster system structure 500, according to embodiments of the present invention. As illustrated in FIG. 5, system structure 500 includes one or more primary/candidate systems 502 and one or more node systems 512. A primary/candidate system 502 includes a scheduler 504, a local cache 506, a resource manager 508, and a workload manager 510. A node system 512 includes an agent 514 and workload 516. A scheduler 504 is responsible for scheduling workloads for a cluster, for example, based on policies, requirements, and/or the like. A local cache 506 can store data for the cluster and support functions of other components. A workload manager 510 can manage the workloads for a cluster. A resource manager 508 can manage the resources of a cluster. An agent 514 can work with a primary/candidate system and perform actions for workload(s) 516 on a node 512. An agent 514 can detect network issues related to cross-site workloads (e.g., workloads that are managed and run across multiple sites/systems in a cluster, etc.).

Figure 6:
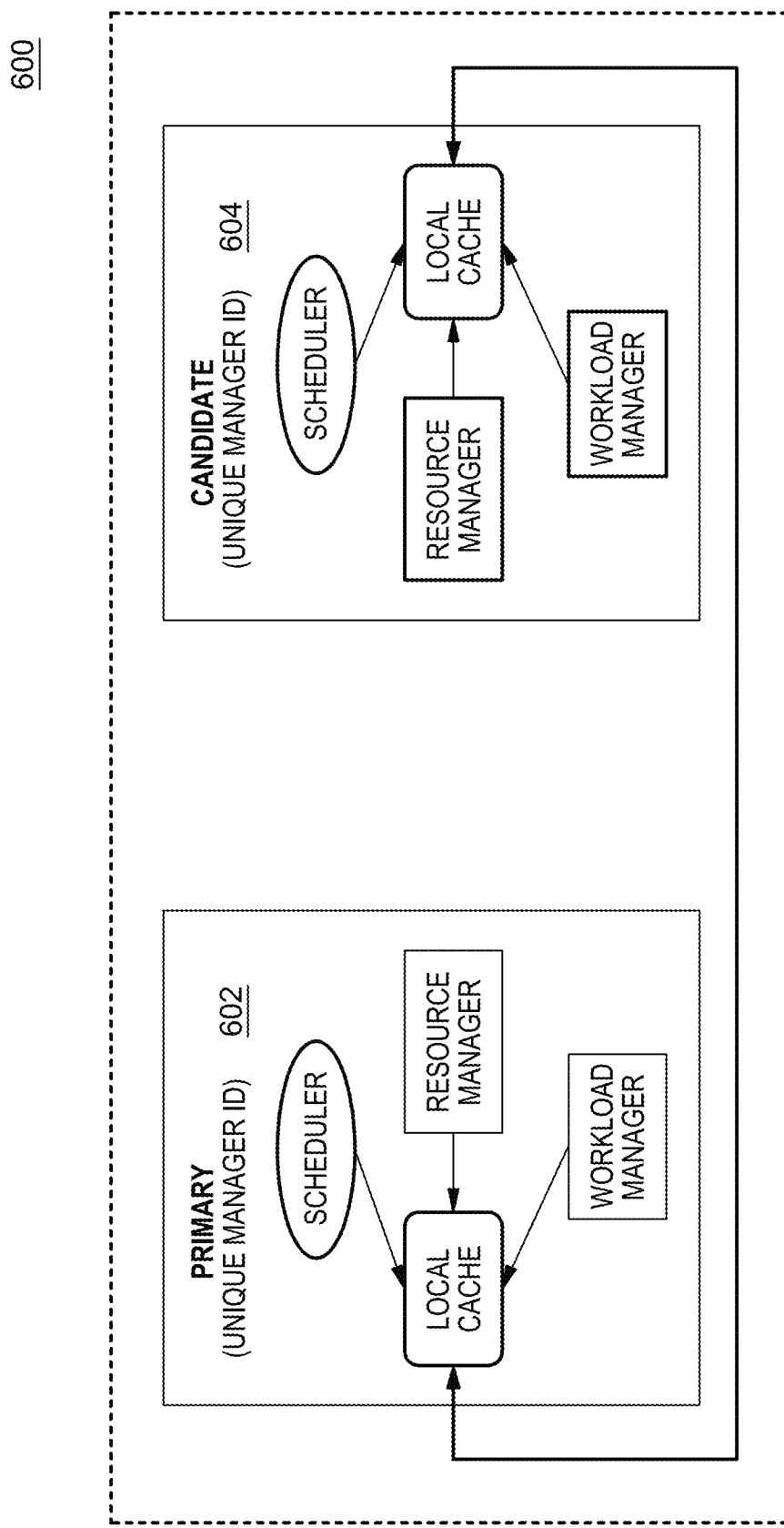
FIG. 6 depicts a block diagram of an example cluster, according to embodiments of the present invention.

FIG. 6 depicts a block diagram of an example of a portion of a cluster 600, according to embodiments of the present invention. As illustrated in FIG. 6, a cluster 600 can include one or more sites, such as site 602 (e.g., primary, etc.) and site 604 (e.g., candidate, etc.). Each site can be assigned a primary manager or a candidate manager, such as described in FIG. 5. In normal operations, the sites 602 and 604 included in cluster 600 are in communication (e.g., network link, etc.) and workloads can be scheduled/managed (e.g., by primary manager, etc.) among the sites/nodes included in the cluster. In some embodiments, each site manager (e.g., primary, candidate) can be assigned a unique manager identifier. Workloads can be identified by a workload identifier that includes a manager identifier and a job identifier such that the workload identifier is always globally unique. Each primary and candidate manager includes a local cache that can be used to read and write cluster data. In some embodiments, the cache can be automatically synced in an incremental manner.

In some embodiments, the automatic syncing of the cache between sites is based on a calculation of a workload cost for a given cross-site workload. In some embodiments, the calculation of the workload cost includes three types of values: (i) real values, (ii) predicted values, and (iii) weight values. The real values may include, for example, CPU run time (C), memory usage (M), input/output file size (F), run time (R), and network IO (N). The predicted values may be predicted using a simulator component (not shown) that utilizes historical values, and may include, for example, total CPU run time (CT), total memory usage (MT), total file size (FT), total run time (RT), and total network IO (NT). The weight values may be predefined by an administrator, and may include, for example, a CPU run time weight (CW), a memory usage weight (MW), a file size weight (FW), a run time weight (RW), a network IO weight (NW), and an overall weight (SW) defined as a sum or other combination of CW, MW, CW, RW, and/or NW. In some embodiments, the workload cost is calculated as follows: C/CT*CW/SW+ M/MT*MW/SW+F/FT*FW/SW+R/RT*RW/SW+N/ NT*NW/SW. In some embodiments, when the workload cost exceeds a predetermined threshold, workload data for the workload is synchronized (or prepared for synchronization) across sites (for example, between respective caches of site 602 and site 604) for recovery in case of a communication link break. In other (or the same) embodiments, other metrics may be used, including workload transfer data size and/or other metrics known (or yet to be known) in the art.

Figure 7:
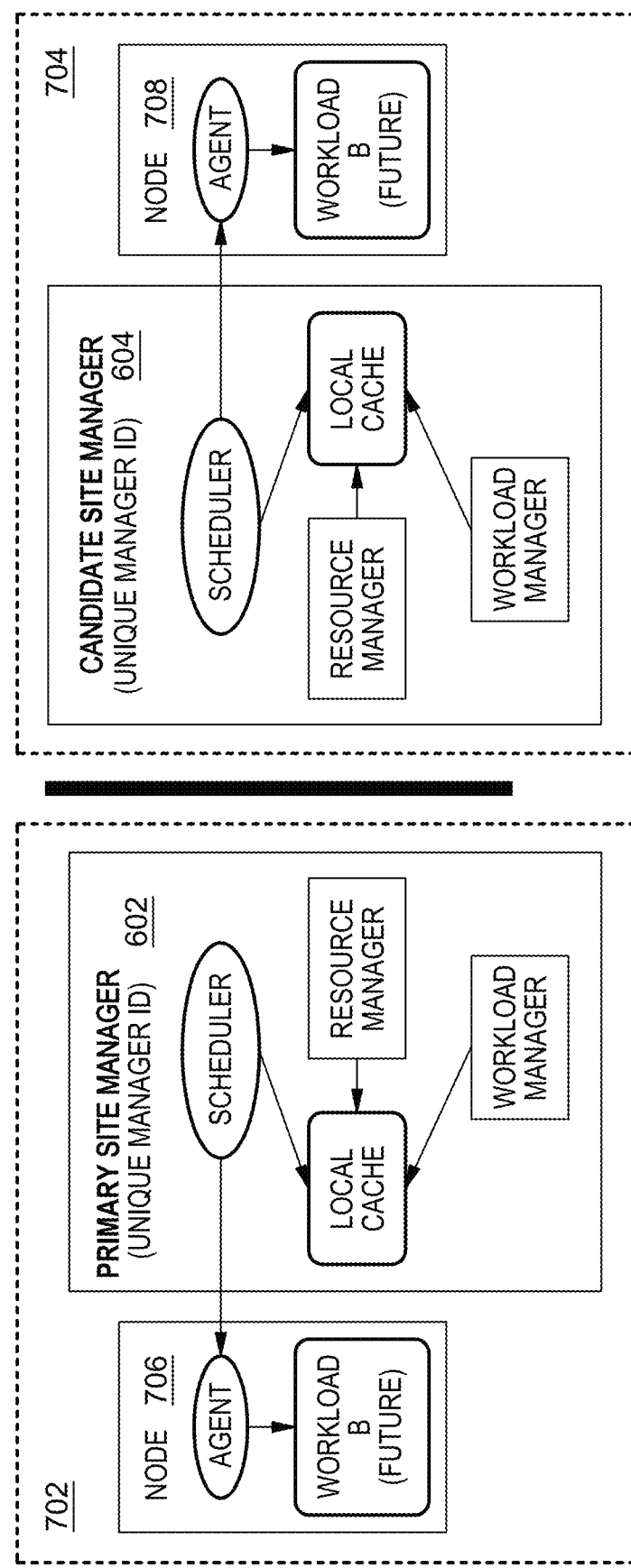
FIG. 7 depicts a block diagram of an example of auto-splitting a cluster following network failure, according to embodiments of the present invention.

FIG. 7 depicts a block diagram of an example of auto-splitting 700 for a cluster following network failure, according to embodiments of the present invention. As illustrated in FIG. 7, if a communication failure (e.g., network failure, etc.) occurs between sites in a cluster, the cluster can be automatically split into sub-clusters, for example, based on the sites that are still in communication. For example, in response to a network failure between site 602 and site 604, the cluster (e.g., cluster 600 of FIG. 6) can be automatically split into sub-cluster 702 and sub-cluster 704. The primary manager included in site 602 continues to manage all sites/nodes that it can communicate with as part of sub-cluster 702. For example, primary manager at site 602 can manage node 706 in sub-cluster 702. A candidate manager at site 604 can become the site manager for the sub-cluster 704 and manage the nodes, such as node 708, associated with the local site included in the sub-cluster 704. As an example, an agent associated with a node can determine a network failure occurred between site 602 and site 604. In some embodiments, for example, the agent in a node can proxy network communications for cross-site workloads (e.g., workloads running across multiple sites) and identify network communications failures. The node 708 agent, for example, can suspend any cross-site workloads that are running at node 708 and save the process data for the cross-sire workload (e.g., dump process context and memory to local storage, etc.). The agent can notify the site manager (e.g., candidate site manager at site 604) to mark the suspend cross-site workload(s) as "future" workload(s). The candidate site manager can continue running local workloads, for example at node 708, with no impact and store data in a local cache associated with the candidate site manager.

Figure 8:
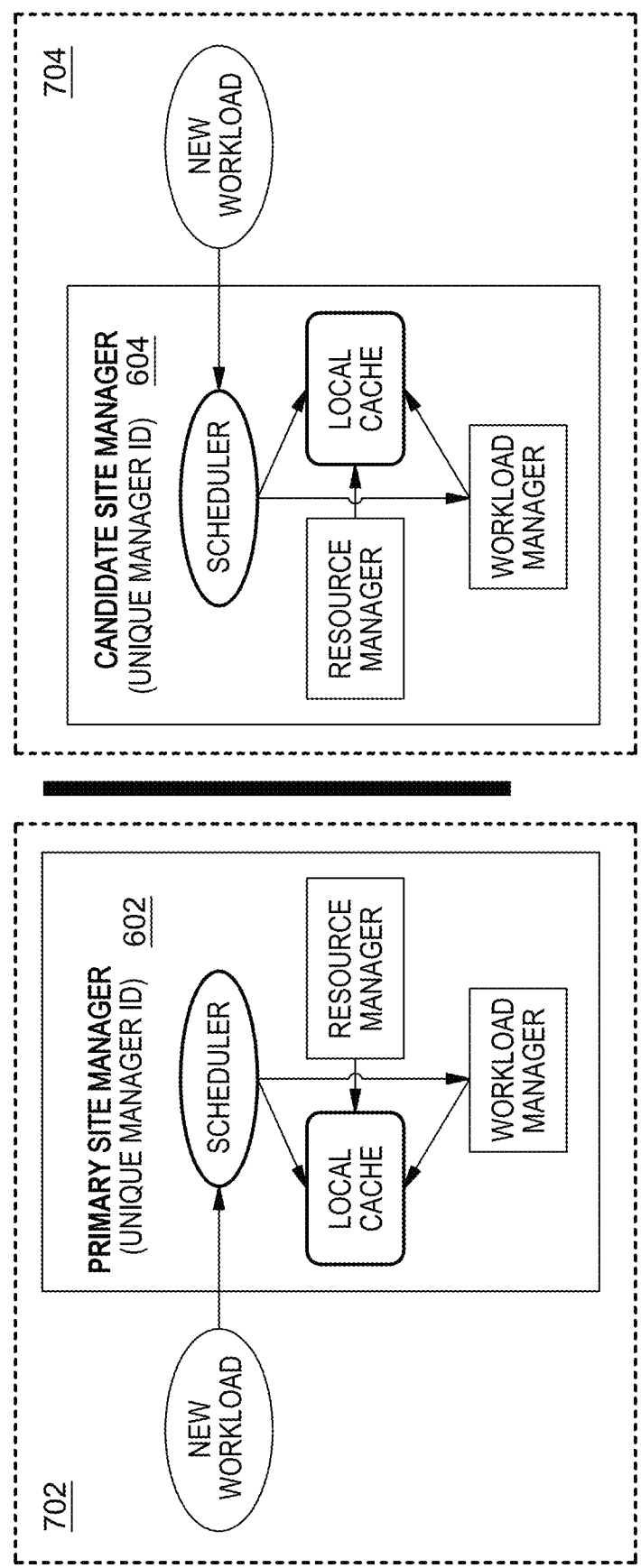
FIG. 8 depicts a block diagram of an example of auto-splitting a cluster following network failure, according to embodiments of the present invention.

FIG. 8 depicts a block diagram of an example of auto-splitting 800 for a cluster following network failure, according to embodiments of the present invention. As illustrated in FIG. 8, in some embodiments, the primary site manager (e.g., site 602) and the candidate site manager (e.g., site 604) can continue to manage nodes as well as schedule and manage workloads in queue. As an example, the site manager(s) can perform a pre-scheduling (e.g., pre-assign) for workloads in a local queue (e.g., by policy, etc.). the site manager can mark the queued workloads as local workloads (e.g., workloads run on local nodes in the sub-cluster, etc.) or as remote workloads (e.g., cross-site workloads, etc.). The site manager can continue to schedule the local workloads as normal. The site manager would not schedule the remote workloads. In some embodiments, the site manager can continue to accept new workloads for the sub-cluster it is managing. Each site manager (e.g., primary site manager, candidate site manager, etc.) can read and/or write sub-cluster data through an associated local cache and save data (e.g., local cache, etc.) to local storage (e.g., local temporary storage, etc.).

Figure 9:
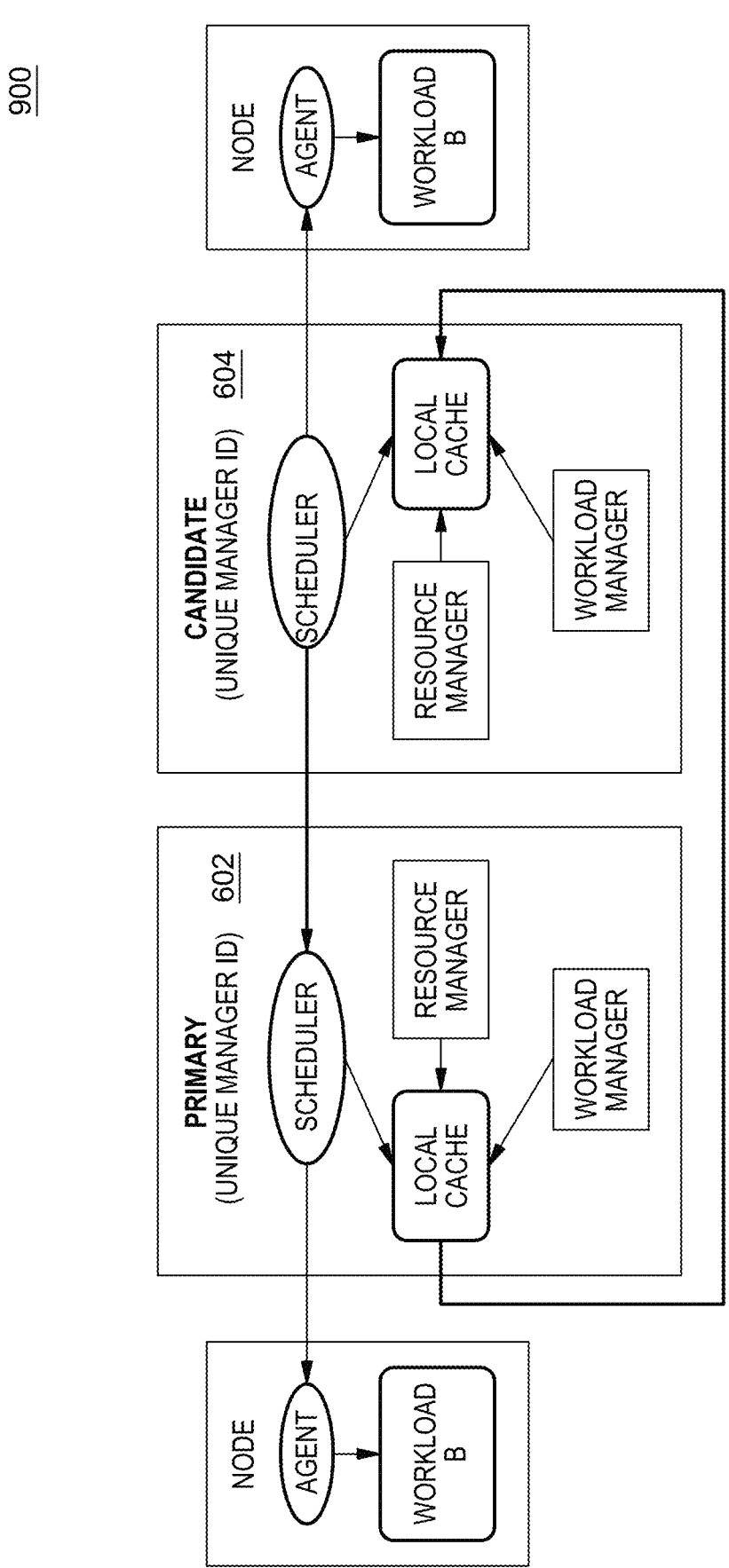
FIG. 9 depicts a block diagram of an example of auto-merging sub-clusters following network issue resolution, according to embodiments of the present invention.

FIG. 9 depicts a block diagram of an example of auto-merging sub-clusters 900 following network issue resolution, according to embodiments of the present invention. As illustrated in FIG. 9, in response to the communication between sites (e.g., sub-clusters, etc.) being restored, the sub-clusters can be automatically merged to reform the cluster. In some embodiments, for example, a site manager (e.g., site 604) of a sub-cluster (e.g., sub-cluster 704) can be restored to cluster candidate status and can provide the sub-cluster data (e.g., data created/changed during network failure, etc.) to the primary manager (e.g., site 602). The primary manager can merge the sub-cluster data with cluster data, for example, based on timestamp, workload identifier, and/or the like, and store the data to cluster storage. As an example, sub-cluster data including stream data, events data, status data, account data, and/or the like can be merged in response to merging the sub-clusters. In some embodiments, the primary manager can notify agents (e.g., at cluster nodes, etc.) to resume workloads that were marked as "future" workloads (e.g., cross-site workloads, etc.). In some embodiments, the primary manager can resume scheduling workloads for the cluster that were marked as remote workloads for the sub-cluster(s).

Figure 10:
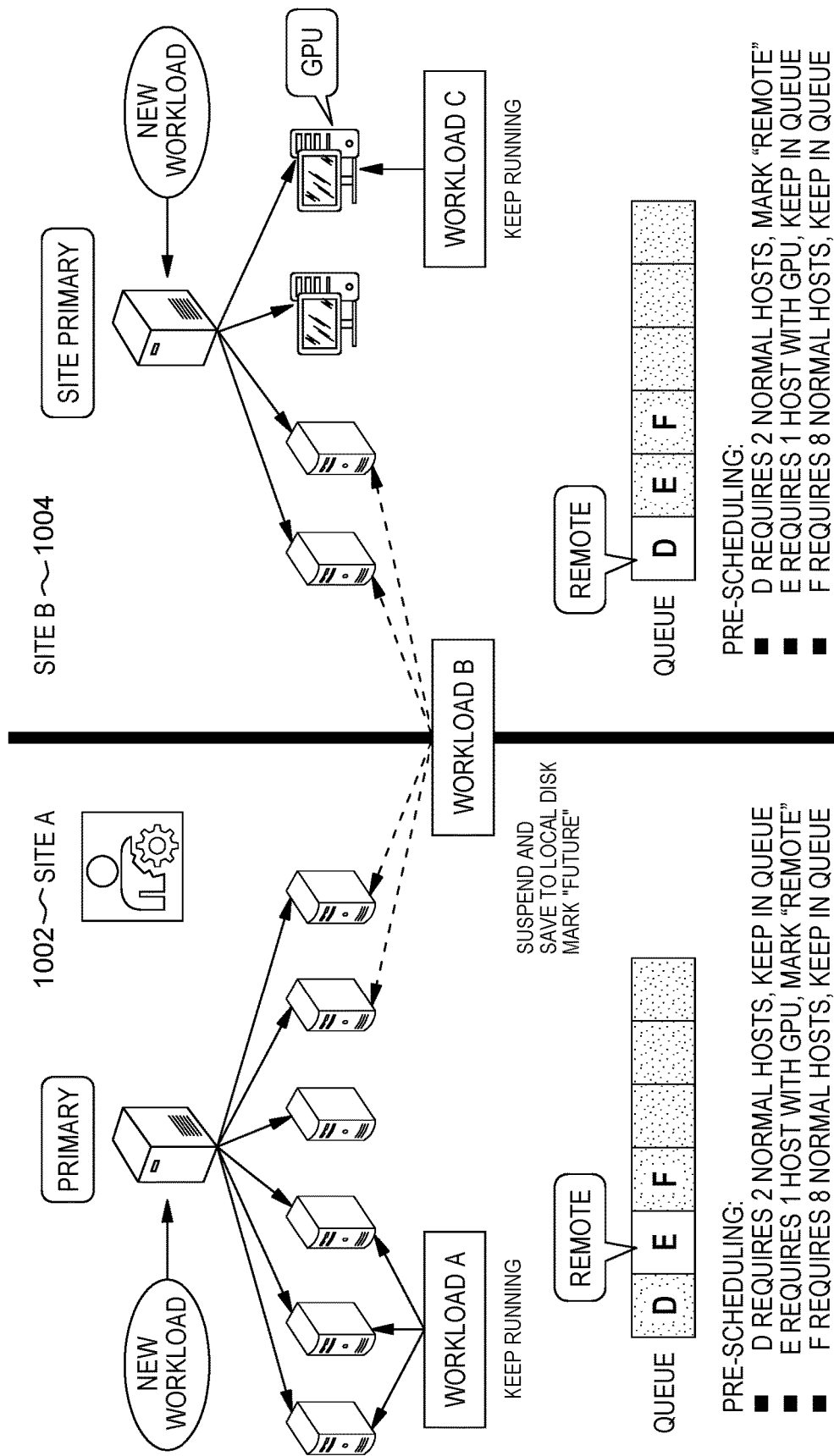
FIG. 10 depicts a block diagram of an example workload change for a split cluster, according to embodiments of the present invention.

FIG. 10 depicts a block diagram of an example workload management 1000 for a split cluster, according to embodiments of the present invention. As illustrated in FIG. 10, in response to a network failure, a cluster can be split into sub-cluster 1002 (e.g., site A, etc.) and sub-cluster 1004 (e.g., site B, etc.). Each sub-cluster can continue running any local workloads, such as workload A in sub-cluster 1002 and workload C in sub-cluster 1004. Any cross-site workloads, such as workload B, can be suspended and marked as "future" workload. Data associated with cross-site workload B can be stored to local memory.

In some embodiments, queued workloads, such as workloads D, E, and F, can be per-scheduled/pre-assigned by a site manager in each sub-cluster. For example, sub-cluster 1002 can mark workload D as local and keep it in the queue as it can be run locally. Sub-cluster 1002 can mark workload E as remote as it requires resources located in another sub-cluster. Sub-cluster 1002 can keep workload F in the scheduling queue because it may be able to run locally. Additionally, in sub-cluster 1004, workload D can be marked as remote and workloads E and F can remain in the queue as they may be scheduled locally.

Figure 11:
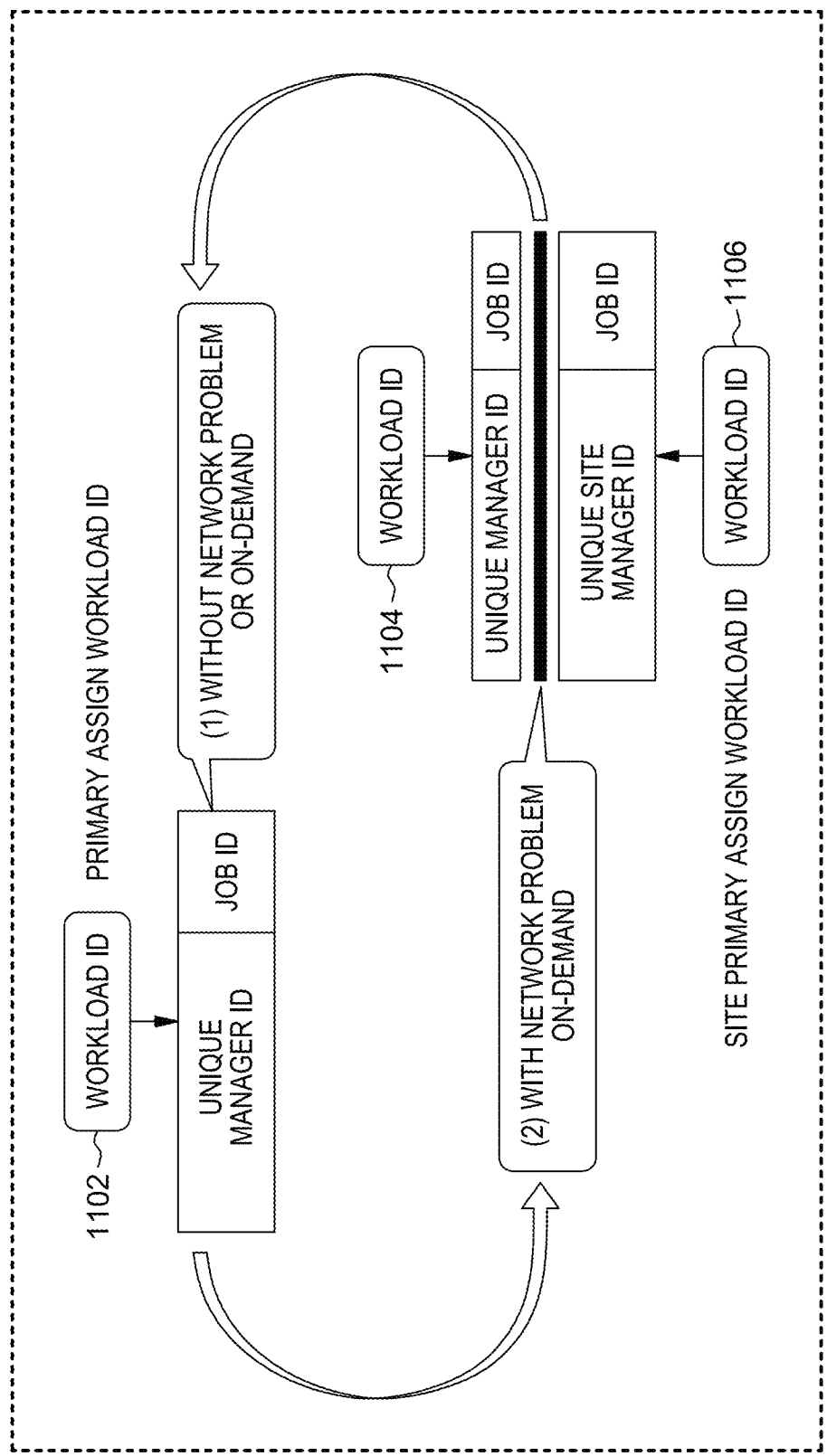
FIG. 11 depicts a block diagram of an example of workload identifier assignment, according to embodiments of the present invention.

FIG. 11 depicts a block diagram of an example of workload identifier assignment 1100, according to embodiments of the present invention. As illustrated in FIG. 11, during normal cluster operations (e.g., all cluster sites in communication, etc.), workload identifier assignment 1102 includes assigning an identifier to each workload based on a unique primary manager identifier and a job identifier to create a globally unique workload identifier.

In response to a network failure and the splitting of a cluster into sub-clusters, workload identifier assignment may be based on a sub-cluster site manager identifier and a job identifier. For example, in a sub-cluster including the primary manager, workload identifier assignment 1104 includes assigning an identifier to each workload based on the unique primary manager identifier and a job identifier. In a sub-cluster including a candidate site manager, workload identifier assignment 1106 includes assigning an identifier to each workload based on the candidate site manager identifier and a job identifier.

Figure 12:
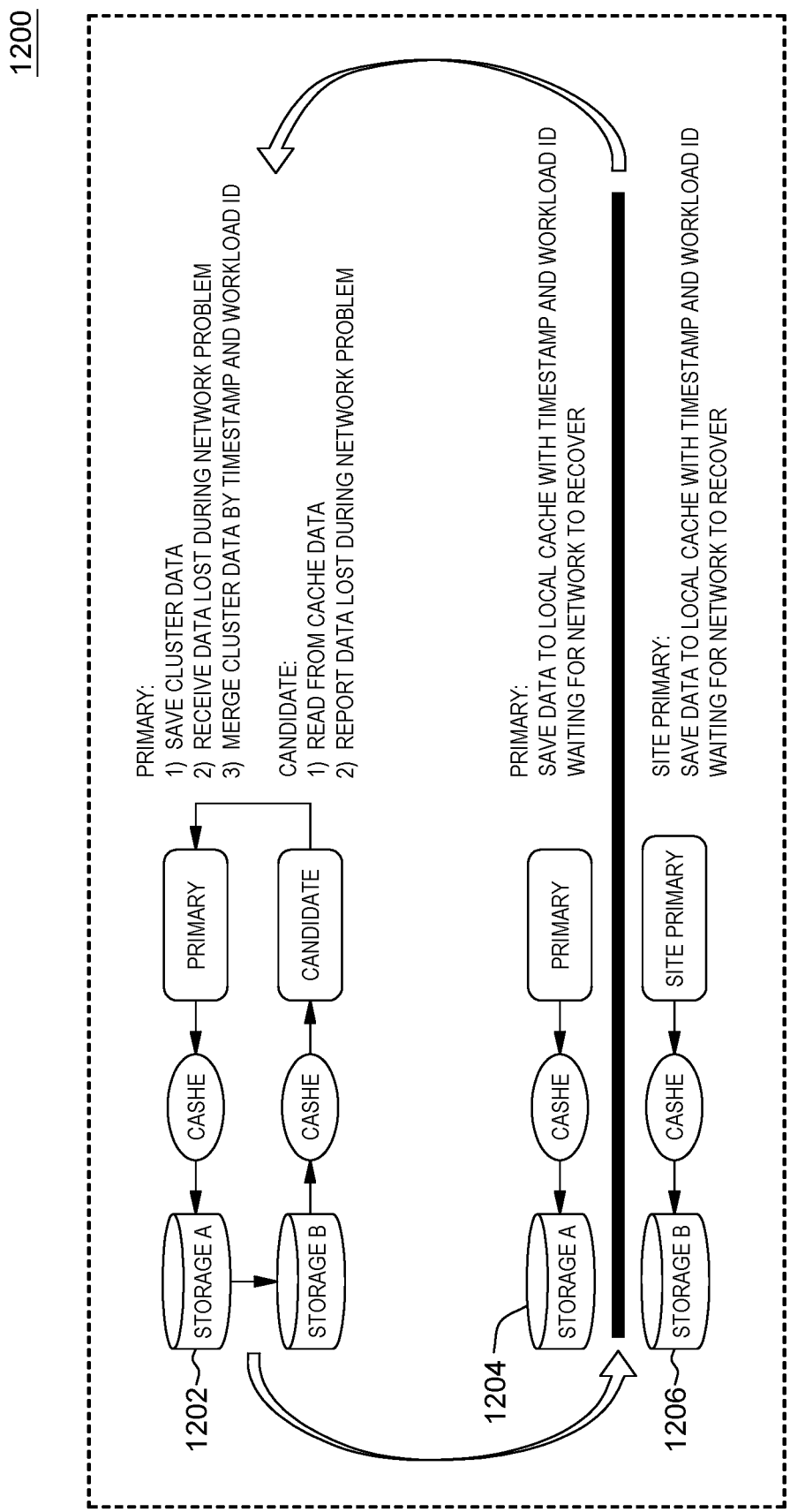
FIG. 12 depicts a block diagram of an example of cluster data management, according to embodiments of the present invention.

FIG. 12 depicts a block diagram of an example of cluster data management 1200, according to embodiments of the present invention. As illustrated in FIG. 12, during merging cluster operations, cluster data management 1202 can include the primary manager storing cluster data (e.g., in cluster primary storage, etc.), receiving sub-cluster data associated with the period of lost communications, and merging the sub-cluster data (e.g., by timestamp and workload identifier, etc.). Cluster data management 1202 can include the candidate manager obtaining locally stored data (e.g., sub-cluster data, etc.) associated with the period of lost communications (e.g., from local cache, temp storage, etc.) and providing the locally stored data (e.g., sub-cluster data, etc.) to the primary manager. During a network failure, sub-cluster data management 1204 for the primary site sub-cluster can include the primary manager storing data locally (e.g., local cache, temp storage, etc.). Sub-cluster data management 1206 for the candidate site sub-cluster can include the candidate manager storing data locally (e.g., local cache, temp storage, etc.).

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   identifying a first workload being processed by a first plurality of sites in a cluster, each site including a site manager and at least one managed node;
   identifying, from the first plurality of sites: (i) a first site as a primary site for processing the first workload, and (ii) a candidate site as a secondary site for processing the first workload;

identifying a communication link issue between a first node of the primary site and a second node of the candidate site;

splitting the cluster into sub-clusters based, at least in part, on the communication link issue, wherein the primary site is included in a first sub-cluster of the sub-clusters and the candidate site is included in a second sub-cluster of the sub-clusters, the second sub-cluster being different from the first sub-cluster; and determining to suspend processing of the first workload and mark the first workload for future processing;

responsive to determining to suspend processing, causing data associated with the first workload to be stored in corresponding local memories of the first sub-cluster and the second sub-cluster.

2. The computer-implemented method of claim 1, further comprising:

identifying a second workload being processed by a second plurality of sites in the cluster;

identifying, from the second plurality of sites: (i) a second site as a primary site for the second workload, and (ii) one or more secondary sites for the second workload;

determining that the second site is included in a second sub-cluster of the sub-clusters; and instructing the second sub-cluster to locally process the second workload.

3. The computer-implemented method of claim 1, wherein:

determining to suspend processing of the first workload is based, at least in part, on: (i) the communication link issue, (ii) processing requirements of the first workload, and (iii) processing capabilities of respective sub-clusters of the sub-clusters.

4. The computer-implemented method of claim 1, further comprising:

determining the communication link issue has been resolved; and merging the sub-clusters back into the cluster, wherein merging the sub-clusters back into the cluster includes:
merging the data from the corresponding local memories of the first sub-cluster and the second sub-cluster into primary storage for the cluster, and
determining to resume processing of the first workload.

5. The computer-implemented method of claim 1, further comprising:

prior to identifying the communication link issue, determining to synchronize data relating to the processing of the first workload between the candidate site and the first site; and determining to locally process the first workload by the first sub-cluster utilizing the synchronized data.

6. The computer-implemented method of claim 5, wherein determining to synchronize the data relating to the processing of the first workload between the secondary site and the first site includes determining that a workload cost of the first workload exceeds a predetermined threshold.

7. The computer-implemented method of claim 5, wherein determining to synchronize the data relating to the processing of the first workload between the secondary site and the first site includes determining that a workload transfer data size of the first workload exceeds a predetermined threshold.

8. A computer program product comprising a computer readable storage medium having stored thereon:

program instructions programmed to identify a first workload being processed by a first plurality of sites in a cluster, each site including a site manager and at least one managed node;

program instructions programmed to identify, from the first plurality of sites: (i) a first site as a primary site for processing the first workload, and (ii) a candidate site as a secondary site for processing the first workload;

program instructions programmed to identify a communication link issue between a first node of the primary site and a second node of the candidate site;

program instructions programmed to split the cluster into sub-clusters based, at least in part, on the communication link issue, wherein the primary site is included in a first sub-cluster of the sub-clusters and the candidate site is included in a second sub-cluster of the sub-clusters, the second sub-cluster being different from the first sub-cluster; and program instructions programmed to determine to suspend processing of the first workload and mark the first workload for future processing;

program instructions programmed to, responsive to determining to suspend processing, cause data associated with the first workload to be stored in corresponding local memories of the first sub-cluster and the second sub-cluster.

9. The computer program product of claim 8, the computer readable storage medium having further stored thereon:

program instructions programmed to identify a second workload being processed by a second plurality of sites in the cluster;

program instructions programmed to identify, from the second plurality of sites: (i) a second site as a primary site for the second workload, and (ii) one or more secondary sites for the second workload;

program instructions programmed to determine that the second site is included in a second sub-cluster of the sub-clusters; and program instructions programmed to instruct the second sub-cluster to locally process the second workload.

10. The computer program product of claim 8, the computer readable storage medium having further stored thereon:

program instructions programmed to determine to suspend processing of the first workload is based, at least in part, on: (i) the communication link issue, (ii) processing requirements of the first workload, and (iii) processing capabilities of respective sub-clusters of the sub-clusters.

11. The computer program product of claim 8, the computer readable storage medium having further stored thereon:

program instructions programmed to determine the communication link issue has been resolved; and program instructions programmed to merge the sub-clusters back into the cluster, wherein merging the sub-clusters back into the cluster includes:
merging the data from the corresponding local memories of the first sub-cluster and the second sub-cluster into primary storage for the cluster, and
determining to resume processing of the first workload.

12. The computer program product of claim 8, the computer readable storage medium having further stored thereon:

program instructions programmed to, prior to identifying the communication link issue, determine to synchronize data relating to the processing of the first workload between the candidate site and the first site; and program instructions programmed to determine to locally process the first workload by the first sub-cluster utilizing the synchronized data.

13. The computer program product of claim 12, wherein determining to synchronize the data relating to the processing of the first workload between the secondary site and the first site includes determining that a workload cost of the first workload exceeds a predetermined threshold.

14. The computer program product of claim 12, wherein determining to synchronize the data relating to the processing of the first workload between the secondary site and the first site includes determining that a workload transfer data size of the first workload exceeds a predetermined threshold.

15. A computer system comprising:
a processor set; and
a computer readable storage medium;
wherein:
the processor set is structured, located, connected and programmed to run program instructions stored on the computer readable storage medium; and
the stored program instructions include:
program instructions programmed to identify a first workload being processed by a first plurality of sites in a cluster, each site including a site manager and at least one managed node;
program instructions programmed to identify, from the first plurality of sites: (i) a first site as a primary site for processing the first workload, and (ii) a candidate site as a secondary site for processing the first workload;
program instructions programmed to identify a communication link issue between a first node of the primary site and a second node of the candidate site;
program instructions programmed to split the cluster into sub-clusters based, at least in part, on the communication link issue, wherein the primary site is included in a first sub-cluster of the sub-clusters and the candidate site is included in a second sub-cluster of the sub-clusters, the second sub-cluster being different from the first sub-cluster; and
program instructions programmed to determine to suspend processing of the first workload and mark the first workload for future processing;
program instructions programmed to, responsive to determining to suspend processing, cause data associated with the first workload to be stored in corresponding local memories of the first sub-cluster and the second sub-cluster.

16. The computer system of claim 15, the stored program instructions further comprising:
program instructions programmed to identify a second workload being processed by a second plurality of sites in the cluster;

program instructions programmed to identify, from the second plurality of sites: (i) a second site as a primary site for the second workload, and (ii) one or more secondary sites for the second workload;
program instructions programmed to determine that the second site is included in a second sub-cluster of the sub-clusters; and
program instructions programmed to instruct the second sub-cluster to locally process the second workload.

17. The computer system of claim 15, the stored program instructions further comprising:
program instructions programmed to determine to suspend processing of the first workload is based, at least in part, on: (i) the communication link issue, (ii) processing requirements of the first workload, and (iii) processing capabilities of respective sub-clusters of the sub-clusters.

18. The computer system of claim 15, the stored program instructions further comprising:
program instructions programmed to determine the communication link issue has been resolved; and
program instructions programmed to merge the sub-clusters back into the cluster, wherein merging the sub-clusters back into the cluster includes:
merging the data from the corresponding local memories of the first sub-cluster and the second sub-cluster into primary storage for the cluster, and
determining to resume processing of the first workload.

19. The computer system of claim 15, the stored program instructions further comprising:
program instructions programmed to determine that a workload cost of the first workload exceeds a predetermined threshold; and
program instructions programmed to determine to synchronize data relating to the processing of the first workload between the candidate site and the first site based, at least in part, on determining that the workload cost of the first workload exceeds the predetermined threshold; and
program instructions programmed to determine to locally process the first workload by the first sub-cluster utilizing the synchronized data.

20. The computer system of claim 15, the stored program instructions further comprising:
program instructions programmed to determine that a workload transfer data size of the first workload exceeds a predetermined threshold; and
program instructions programmed to determine to synchronize data relating to the processing of the first workload between the candidate site and the first site based, at least in part, on determining that the workload cost of the first workload exceeds the predetermined threshold; and
program instructions programmed to determine to locally process the first workload by the first sub-cluster utilizing the synchronized data.

* * * * *